Figure 1:
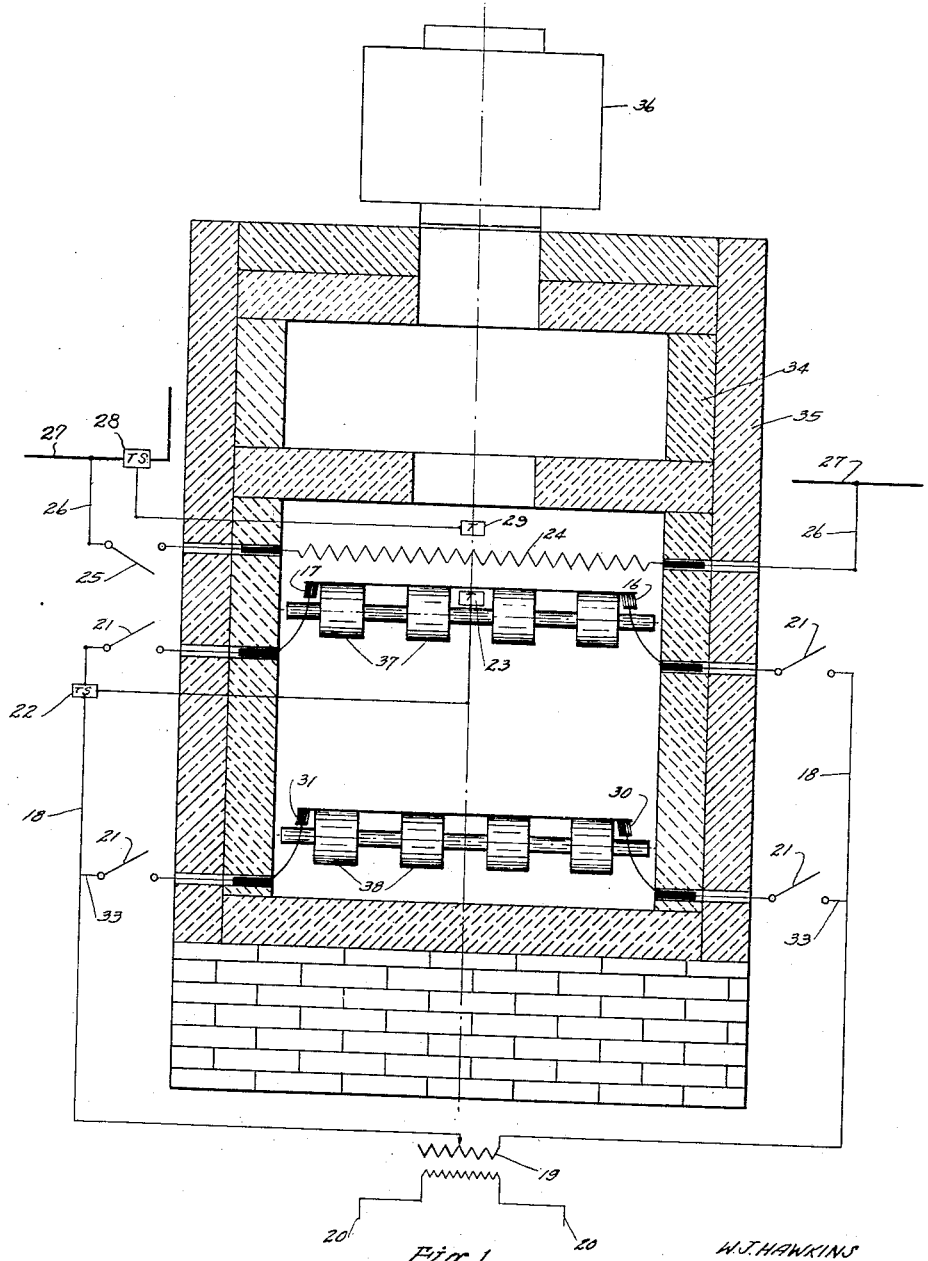

Feb. 7, 1939.   W. J. HAWKINS   2,146,427
OVEN
Filed Nov. 28, 1936   3 Sheets-Sheet 1

W. J. HAWKINS
INVENTOR

BY Henry Savage
ATTORNEY

Feb. 7, 1939.　　　W. J. HAWKINS　　　2,146,427
OVEN
Filed Nov. 28, 1936　　　3 Sheets-Sheet 3

W. J. HAWKINS
INVENTOR

BY Henry Savage
ATTORNEY

Patented Feb. 7, 1939

2,146,427

UNITED STATES PATENT OFFICE 2,146,427

OVEN

Wilford Judson Hawkins, Claiborne, Md., assignor to National Biscuit Company, New York, N. Y., a corporation of New Jersey Application November 28, 1936, Serial No. 113,132

11 Claims. (Cl. 219—35)

My invention relates to ovens and more particularly to band ovens in which the product or articles to be heated or processed therein are supplied to one end of the upper run of a continuous band and, after passing through one or more heating or baking zones, are delivered from the oven at the other end of the upper run. The band, which may be of steel or any other material suitable for the purpose, forms an endless loop that passes around a cylindrical drum at each end of the oven, its upper run being supported intermediate the drums so as to provide a level or horizontal surface. The lower run is likewise supported so that it will not sag too low. The band is driven continuously by rotation of one of the drums to which power is applied. Heat is usually supplied to such ovens by leading products of combustion, properly tempered, or other hot gases through a system of ducts to and from two or more sections of the oven and both above and below the band. The band usually runs the entire length of the oven, receiving the articles at one end and delivering them at the other after passing through the oven.

The principal object of the present invention is to provide means for applying the heat most effectively and efficiently, both bottom heat directly to the band and top heat above the band, and to regulate and control the top and bottom heats independently so as to give any temperature desired in any part of the oven and any desired range of temperature throughout the oven.

More specifically one object of the invention is to provide means to heat the band of an oven through the electrical resistance, to the flow of electric current, of the band itself, or of sections of the band. Another object is to provide top heat, or heat above the band, by the electrical resistance of metallic members or electrical heating elements above the band.

Another object of the invention is to divide the oven into longitudinal sections and to provide independent and automatic control of the current, and hence of the temperature, both top and bottom, supplied to each section.

Another object is to provide means whereby the pressure within the oven may be varied, above or below atmospheric.

Another object is to provide thermostatic means for maintaining and controlling predetermined temperature in the several sections or zones of an oven.

Another object is to provide means whereby the temperatures in the different sections or zones of the oven may be varied, from high to low, in any order and to any degree desired.

Another object of the invention is to provide an oven in which the tops of the articles being baked or treated are directly subjected to radiant heat which I have found produces results or effects heretofore not attainable in ovens heated solely by hot gases and products of combustion.

The above and other objects of the invention are attained by the embodiment thereof shown in the accompanying drawings wherein I have illustrated an oven and controls adapted for baking biscuits and the like, but not limited to that use.

Fig. 1 is a vertical cross section through an oven.

Figure 2:
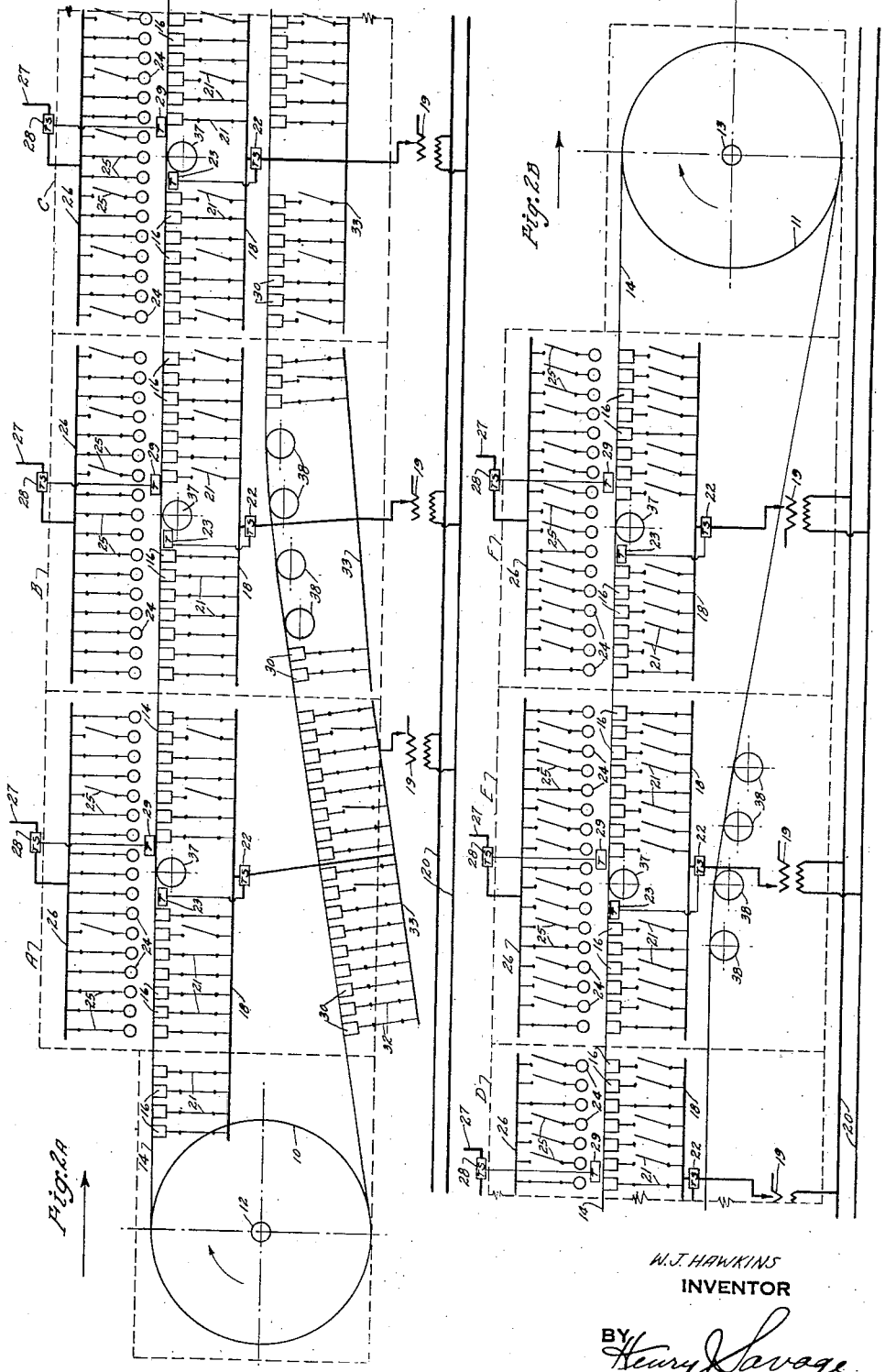
Figure 3:
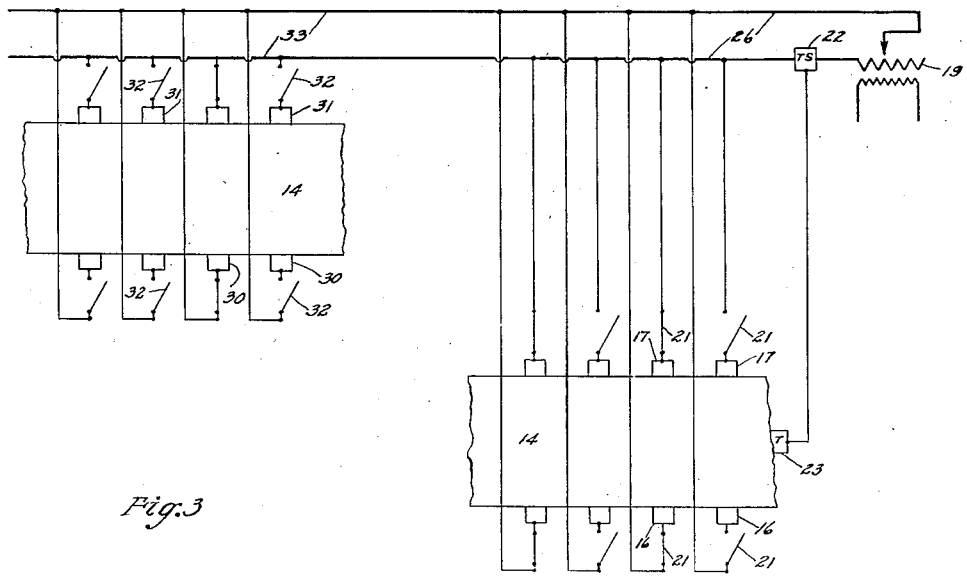
Figure 4:
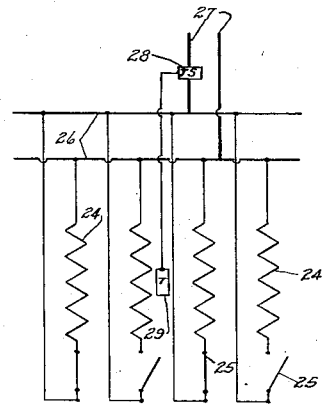

Figs. 2A and 2B together form a longitudinal vertical, diagrammatic section through a band oven, the electrical connections and controls being shown diagrammatically. Figs. 3 and 4 are parts of the wiring diagrams.

Referring to Figs. 2A and 2B, the oven is divided into several sections or zones indicated at A, B, C, D, E and F, which are independently heated and controlled, drums 10 and 11 being mounted at opposite ends of the oven on shafts 12 and 13, which are insulated from the rest of the oven. An endless metal band 14 passes around the drums and through the oven and is driven continuously by power applied to one of the shafts 12 or 13. The articles to be baked or otherwise treated in the oven are delivered to the upper run of the band just before it enters the section A of the oven and are delivered fully baked as the band emerges from the zone F at the opposite end.

The upper run of the band as it passes through the oven is electrically heated to bake the products on it and electrical heating elements above the band heat the tops of the products. The electrical connections and hence the temperatures within each zone of the oven are separately controlled so that not only may different temperatures be maintained in each zone but the temperatures may vary from high to low or in any manner desired throughout the oven.

The band 14 is heated by its resistance to the flow of electric current across it. The band is of substantial width, usually several feet, and electrical connections are made to its opposite edges so that the current will flow across the band, and since it is preferably made of steel its resistance is high and it will be heated by the current flowing thereacross.

In each section or zone of the oven a number of brushes 16 contact with one edge of the band or near its edge and a number of similar brushes 17 contact with the opposite edge of the band. These pairs of brushes 16 and 17 are connected in multiple to a bus bar or heavy conductor 18 which receives electric current from the low tension adjustable transformer 19 which is connected in the main power line 20. Each pair of brushes is separately controlled by a switch 21 and all of the brushes in each zone are controlled by a thermostatic switch 22 which is controlled by the thermostat 23. The thermostat 23 preferably is placed just under the band 14 but of course it may be located at any point found desirable for controlling the temperature in its particular zone.

Heat is applied above the band by a number of electrical heating elements 24 which are mounted in multiple for each zone and are independently controlled by switches 25 and are all connected to the bus bar 26 which receives high tension current from the main line 27. This main line 27 may be the same as the main line 20 which supplies current to the transformers 19. All of the top heating elements in each zone are controlled by the thermostatic switch 28 which is actuated by the thermostat 29 (one for each zone) preferably located a short distance above the band 14, as shown in Figs. 1, 2A and 2B.

After the band has delivered the baked products and passed around the drum 11 its lower run cools off on its passage back to the charging end of the oven. With many varieties of bakery products it is necessary that the band be hot when the dough articles are delivered to it. I therefore provide pre-heating means for the lower run of the band so that it will be hot before it enters the oven on its upper run. For this purpose I use a number of brushes or contacts 30, 31, which are independently controlled in pairs by switches 32, the same as the brushes 16 and 17. All of these brushes in one zone are connected to a common bus bar 33 which receives low tension current from one of the transformers 19 just the same as the connections to the upper run of the band.

It will be seen by these means that I can obtain any desired temperature in any zone of the oven and that the temperature in each zone is independent of that in the other zones. Thus I may have the highest temperature in zone A and have the temperature decrease in any manner desired down to the lowest temperature in zone F, or I may have the highest temperature at an intermediate zone and lower temperatures in zones A and F, or the temperatures may be constant through all the zones.

While I have shown the switches 21 as manually controlled and the automatic switches 22 as controlling all of the heating elements in each zone, it will be understood that this is for purposes of illustration only and that the switches 21 may be automatically controlled and instead of one thermostatic switch 22 I may use a plurality of the switches in the circuits for the individual pairs of brushes.

I have shown pre-heating brushes 30 on the lower run of the band in zones A, B and C but this also is for purposes of illustration only and I may use these pre-heating brushes only on the lower run of the band just before it reaches the drum 10 and none in zones B and C.

Referring to Fig. 1, this shows a cross section through an oven, according to my invention, wherein the oven is insulated as shown at 34, 35, and a blower 36 is provided which is reversible so as to produce either a partial vacuum or pressure above atmospheric within the oven. The upper run of the band 14 is supported by a number of auxiliary rollers 37 so as to maintain it horizontal and its lower run is supported by a number of auxiliary rollers 38 to prevent its sagging too far below the drums 10 and 11.

It will be understood that the drawings are but illustrative of one form in which my invention may be embodied and that it is capable of any other modifications, and I claim as my invention all such modifications and adaptations that may come within the scope of my claims.

While I have shown the brushes 16, 17 and 30, 31 as contacting directly with the underside of the band, this contact may be made with the extreme edges of the band or the brushes may be attached to the band itself and contact with insulated segments on the oven frame.

What I claim is—

1. In a device of the class described, an endless metallic conveyor of relatively high electrical resistance, drums spaced apart around which said conveyor passes to provide upper and lower runs, means for rotating said drums to drive said conveyor, electric connections of opposite potential having sliding connection with opposite side edges of one of the runs of said conveyor whereby the path of least resistance between said connections is directly across the conveyor and the heating of the conveyor is localized in said path of least resistance.

2. In a device of the class described, an endless metallic conveyor of relatively high electrical resistance, drums spaced apart around which said conveyor passes to provide upper and lower runs, means for rotating said drums to drive said conveyor, a plurality of electric connections of opposite potential having sliding electrical connection with opposite edges of one of the runs of said conveyor for a part only of its length whereby the path of least resistance between said connections is directly across the conveyor and the heating of the conveyor is localized in said path of least resistance, and means for varying the number of said connections that are operative.

3. In a device of the class described, an endless metallic conveyor of relatively high electrical resistance, horizontal drums spaced apart around which said conveyor passes to provide upper and lower runs, means for rotating said drums to drive said conveyor, a group of electric connections of one potential connected to one edge of one of said runs for a part only of its length, a second group of electric connections of opposite potential connected to a part only of the other edge of the same run opposite the first group of connections, whereby the path of least resistance between said groups of connections is directly across the said run of the conveyor and the heating of the conveyor is localized in said path of least resistance, and means responsive to temperature changes adjacent said part of the run for controlling the flow of current through said connections.

4. In a device of the class described, an oven having a plurality of separate heating zones, a pair of drums at opposite ends of said oven, an endless metal belt of relatively high electrical resistance passing around said drums and through said zones, means for driving said drums and belt, each zone having an independent electrical connection to one of the runs of the belt passing through it, each of said connections comprising a number of independent conductors contacting said belt at one edge and a number of independent conductors of opposite potential contacting the opposite edge of said belt, whereby said belt will be independently heated in each zone.

5. In a device of the class described, an oven having a plurality of separate heating zones, a pair of drums at opposite ends of said oven, an endless metal belt of relatively high electrical resistance passing around said drums and through said zones, means for driving said drums and belt, each zone having an independent electrical connection to one of the runs of the belt passing through it, each of said connections comprising a number of independent conductors contacting said belt at one edge and a number of independent conductors of opposite potential contacting the opposite edge of said belt, whereby said belt will be independently heated in each zone, and means for independently rendering said opposite pairs of conductors effective or ineffective to determine the temperature of the belt in each zone.

6. In a device of the class described, an oven having a plurality of separate heating zones, a pair of drums at opposite ends of said oven, an endless metal belt of relatively high electrical resistance passing around said drums and through said zones, means for driving said drums and belt, each zone having an independent electrical connection to one of the runs of the belt passing through it, each of said connections comprising a number of independent conductors contacting said belt at one edge and a number of independent conductors of opposite potential contacting the opposite edge of said belt, whereby said belt will be independently heated in each zone, and means controlled by the temperature in each zone for opening and closing the electrical connection therein.

7. In a device of the class described, an oven having a plurality of separate heating zones, a pair of drums at opposite ends of said oven, an endless metal belt of relatively high electrical resistance passing around said drums and through said zones, means for driving said drums and belt, each zone having an independent electrical connection to one of the runs of the belt passing through it, each of said connections comprising a number of independent conductors contacting said belt at one edge, a number of independent conductors of opposite potential contacting the opposite edge of said belt, whereby said belt will be independently heated in each zone, means for independently rendering said opposite pairs of conductors effective or ineffective to determine the temperature of the band in each zone, and mans controlled by the temperature in each zone for opening and closing the electrical connection.

8. In a device of the class described, an oven, an endless metallic belt in the oven passing over drums at opposite ends thereof, means for heating said belt, said heating means including electrical connections of one potential connected to one edge of a part of the upper run of the belt and electrical connections of opposite potential connected to the opposite edge of said part of the belt whereby the path of least resistance between said connections will be across said belt and the heat will be localized to said part, said heating means also including radiant heating elements above said part of the upper run.

9. In a device of the class described, an oven divided into separate heating zones, an endless metallic belt passing through said zones and around drums at opposite ends of the oven, independent electric connections to the belt in each zone for heating the belt, said heating means including electrical connections of one potential slidably connected to one edge of the belt within the zone and electrical connections of opposite potential slidably connected to the opposite edge of the belt within said zone whereby the path of least resistance between said connections, will be across said belt and the heat will be localized within said zone, a number of independent electric radiant heaters in each zone above the belt, and means for varying the number of electric connections and heaters that are effective in each zone to determine the temperature therein.

10. In a device of the class described, an oven divided into separate heating zones, an endless metallic belt having its upper run passing successively through said zones and around drums at opposite ends of the oven, independent electric connections to opposite edges of the upper run of the belt in each zone for heating the belt, said heating means including electrical connections of one potential slidably connected to one edge of the belt within the zone and electrical connections of opposite potential slidably connected to the opposite edge of the belt within said zone whereby the path of least resistance between said connections will be across said belt and the heat will be localized within said zone, a number of independent electric heaters in each zone above the upper rim of the belt, means for varying the number of electric connections and heaters that are effective in each zone to determine the temperature therein and means controlled by the temperature in each zone for rendering all of the heaters in that zone active or inactive.

11. In a device of the class described, an oven divided into separate heating zones, an endless metallic belt having its upper run passing successively through said zones and around drums at opposite ends of the oven, independent electric connections to opposite edges of the upper run of the belt in each zone for heating the belt by the flow of electric current thereacross, a number of independent electric heaters in each zone above the upper run of the belt, means for varying the number of heaters that are effective in each zone to determine the temperature therein, means controlled by the temperature above the belt in each zone for rendering all of the electric heaters in that zone active or inactive, and means controlled by the temperature adjacent the belt in each zone for rendering all of the connections to the belt active or inactive in that zone.

WILFORD JUDSON HAWKINS.